United States Patent
Hu et al.

(10) Patent No.: US 12,135,984 B2
(45) Date of Patent: Nov. 5, 2024

(54) APPLICATION MANAGEMENT METHOD AND APPARATUS, AND DEVICE

(71) Applicant: HUAWEI TECHNOLOGIES CO., LTD., Shenzhen (CN)

(72) Inventors: Huifeng Hu, Hangzhou (CN); Xiaojun Duan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 631 days.

(21) Appl. No.: 17/391,165

(22) Filed: Aug. 2, 2021

(65) Prior Publication Data

US 2021/0357252 A1 Nov. 18, 2021

Related U.S. Application Data

(63) Continuation of application No. PCT/CN2020/071786, filed on Jan. 13, 2020.

(30) Foreign Application Priority Data

Feb. 2, 2019 (CN) .......................... 201910106438.0

(51) Int. Cl.
*G06F 9/44* (2018.01)
*G06F 9/48* (2006.01)
*G06F 9/50* (2006.01)
*G06F 9/54* (2006.01)
*G06F 3/04842* (2022.01)

(52) U.S. Cl.
CPC ............ *G06F 9/485* (2013.01); *G06F 9/5038* (2013.01); *G06F 9/542* (2013.01); *G06F 3/04842* (2013.01)

(58) Field of Classification Search
CPC ....................................................... G06F 9/485
USPC ........................................................ 718/102
See application file for complete search history.

(56) References Cited

U.S. PATENT DOCUMENTS

| 2013/0067475 A1 | 3/2013 | Singh et al. |
| 2017/0269965 A1 | 9/2017 | Son et al. |

FOREIGN PATENT DOCUMENTS

| CN | 105159776 A | 12/2015 |
| CN | 106055974 A | 10/2016 |
| CN | 106201674 A | 12/2016 |
| CN | 106959857 A | 7/2017 |
| CN | 107506235 A | 12/2017 |
| CN | 109144232 A | 1/2019 |

*Primary Examiner* — Timothy A Mudrick
(74) *Attorney, Agent, or Firm* — Maier & Maier, PLLC (57) ABSTRACT

The exemplary embodiments may provide an application management method and apparatus, and a device, to unfreeze some processes in an application. The method includes: obtaining an unfreezing event, where the unfreezing event includes process information, and the unfreezing event is used to trigger an unfreezing operation to be performed on some processes in a frozen application; and performing an unfreezing operation on the some processes based on the process information.

18 Claims, 4 Drawing Sheets

APPLICATION MANAGEMENT METHOD AND APPARATUS, AND DEVICE

CROSS-REFERENCE TO RELATED APPLICATIONS

This application is a continuation of International Application No. PCT/CN2020/071786, filed on Jan. 13, 2020, which claims priority to Chinese Patent 201910106438.0, filed on Feb. 2, 2019. The disclosures of the aforementioned applications are hereby incorporated by reference in their entireties.

TECHNICAL FIELD

An exemplary embodiment relates to the field of computer technologies and to an application management method and apparatus, and a device.

BACKGROUND

In an Android native operating system (referred to as an operating system for short), an application program (app) can run continuously in a background. An original equipment manufacturer (OEM) usually introduces a freezing mechanism. The mechanism enables the operating system to perform a freezing operation on an application switched to a background, so that the application stops running. This reduces system power consumption of a terminal device and optimizes system performance of the terminal device. In scenarios such as tapping the application by a user, message receiving over a network, and scheduled task triggering, the operating system needs to run the frozen application.

Correspondingly, the original equipment manufacturer further introduces an unfreezing mechanism. The mechanism enables the operating system to perform an unfreezing operation on a frozen application, so that the application that is allowed to be unfrozen can perform corresponding processing. For example, when at least one of the following events occurs: a non-proxy system broadcast event, a system broadcast over-limit event, a foreground event, an event in which there is a network data packet in instant messaging (IM) or the like, and a subprocess exit event, the foregoing event may trigger the operating system to activate the unfreezing mechanism. The mechanism enables the operating system to perform an unfreezing operation on a frozen application, so that the application that is allowed to be unfrozen can process the foregoing event. In addition, within a period of time after processing of the foregoing event is completed, the system usually continues to perform a freezing operation on the application according to the freezing mechanism.

However, as the foregoing event frequently occurs, the application is unfrozen and frozen repeatedly, and consequently the application switched to the background preempts a resource of an application working in a foreground. As a result, running performance of the application working in the foreground is deteriorated, unnecessary power consumption of the application working in the foreground is caused, the application cannot be kept in a constant frozen state, and a freezing effect even fails in a serious situation. In addition, an empty process in the application needs to exit before being reclaimed, and consequently the application needs to be unfrozen. After the process exits, the process is started by another process in the application, and then is frozen after a period of time. After the application is frozen, the process becomes an empty process again and then is reclaimed. In this case, the application is unfrozen and frozen repeatedly, resulting in unnecessary power consumption of the application.

SUMMARY

An exemplary embodiment provides an application management method, apparatus, and device, to resolve problems such as resource preemption, a waste of power, and deterioration in running performance of an application that are caused by repeated unfreezing and freezing of the application.

According to a first aspect, an exemplary embodiment provides an application management method, including: obtaining an unfreezing event, where the unfreezing event includes process information, and the unfreezing event is used to trigger an unfreezing operation to be performed on some processes in a frozen application; and determining the some processes in the target application based on a correspondence between an application and a process and the process information, and performing an unfreezing operation on the some processes.

According to the application management method provided in the first aspect, a terminal device may obtain the unfreezing event including the process information, where the unfreezing event may indicate to trigger the unfreezing operation to be performed on the some processes in the frozen application; and the terminal device may determine the some processes in the target application based on the correspondence between an application and a process and the process information, and perform the unfreezing operation on the some processes. In this way, normal running of some functions of the target application is implemented, so that the target application can perform corresponding processing; and there is no need to perform an unnecessary unfreezing operation on other processes in the target application or the entire target application, so that problems such as resource preemption, a waste of power, and deterioration in running performance of an application that are caused by repeated unfreezing and freezing of the application are resolved. This reduces operation frequency of repeated unfreezing and freezing of the application, and increases a freezing rate of the application, thereby reducing system power consumption of the terminal device, and optimizing system performance of the terminal device.

An operating system used by the terminal device may include but is not limited to an Android native operating system, and therefore the terminal device can obtain an event and perform an operation on the event, for example, perform a freezing operation and an unfreezing operation.

The terminal device may be a wireless terminal or a wired terminal. The wireless terminal may be a device that provides a user with voice and/or connectivity of other service data, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, and exchanges voice and/or data with the RAN. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or user equipment (or User Device). This is not limited herein. A person skilled in the art can understand that a multi-process mechanism is usually used for an application. For example, when one application is enabled, a plurality of active processes are usually started. For example, a communication application such as WeChat includes approximately five active processes, a playback software application such as iQiYi includes approximately nine active processes, and an entertainment gossip application such as Headlines Today includes approximately seven active processes.

In a possible embodiment, before the determining the some processes in the target application based on a correspondence between an application and a process and the process information, and performing an unfreezing operation on the some processes, the method further includes:
  determining, based on the correspondence between an application and a process and the process information, the target application corresponding to the process information.

In a possible embodiment, the unfreezing event further includes an application identifier, where the application identifier is used to identify the application corresponding to the process information; and
  before the determining the some processes in the target application based on a correspondence between an application and a process and the process information, and performing an unfreezing operation on the some processes, the method further includes:
  determining the target application corresponding to the application identifier.

In a possible embodiment, the determining the some processes in the target application based on a correspondence between an application and a process and the process information, and performing an unfreezing operation on the some processes includes:
  when it is determined that the unfreezing event satisfies an unfreezing condition of the some processes, determining the some processes in the target application based on the correspondence between an application and a process and the process information, and performing the unfreezing operation on the some processes.

In a possible embodiment, the unfreezing condition of the some processes includes at least N of the following conditions, where N is a natural number;
  the unfreezing event is not a tapping event;
  a type of the unfreezing event does not belong to a highly user-perceived type; and
  the application corresponding to the unfreezing event is not included in a prediction application set, where the prediction application set includes at least one application to be used by a user.

According to the application management method provided in this implementation, when the unfreezing event satisfies the unfreezing condition of the some processes, the terminal device may determine the some processes in the target application, and perform the unfreezing operation on the some processes in the target application; or when the unfreezing event does not satisfy the unfreezing condition of the some processes, the terminal device may determine the target application, and perform the unfreezing operation on the target application. In this way, an object on which the unfreezing operation is to be performed is determined in a timely and accurate manner, and that the application cannot normally run because of a misoperation is avoided.

In a possible embodiment, the method further includes:
  obtaining, based on a correspondence between a process and a resource and the process information of the some processes, a resource corresponding to at least one of the some processes, and allocating the resource to the at least one process.

According to the application management method provided in this implementation, after performing the unfreezing operation on the some processes in the target application, the terminal device may obtain, based on the correspondence between a process and a resource and the process information of the some processes, the resource corresponding to the at least one of the some processes, and allocate the resource to the at least one process, so that the at least one process can accurately obtain the corresponding resource, and no other resource needs to be allocated to the at least one process. This implements intelligent resource allocation, and reduces required system resources to the utmost, thereby avoiding a waste of resources, and improving resource allocation efficiency and utilization.

In a possible embodiment, the method further includes:
  when resources corresponding to the some processes are not obtained based on the correspondence between a process and a resource and the process information of the some processes, obtaining, based on a correspondence between an application and a resource and the application identifier, a resource corresponding to the target application, and allocating the resource to the target application.

According to the application management method provided in this implementation, after performing the unfreezing operation on the some processes in the target application, because the terminal device cannot obtain the resources corresponding to the some processes based on the correspondence between a process and a resource and the process information of the some processes, the terminal device may obtain, based on the correspondence between an application and a resource and the application identifier, the resource corresponding to the target application, and allocate the resource to the target application. In this way, the target application can obtain the corresponding resource in a timely and accurate manner for normal running, thereby improving resource allocation efficiency.

In a possible embodiment, the tapping event includes any one of a desktop icon tapping event, a notification bar tapping event, a recent-task-list tapping event, and a lock screen tapping event.

In a possible embodiment, the highly user-perceived type includes an alarm clock application triggering type or a music application timed playback type.

In a possible embodiment, the unfreezing event includes any one of a tapping event, a system broadcast event, and an application timed reminder event.

In a possible embodiment, the process information is a process ID.

According to the application management method provided in this implementation,
  According to a second aspect, an embodiment provides a terminal device, including a receiver and a processor, where the receiver is connected to the processor;
  the receiver is configured to obtain an unfreezing event, where the unfreezing event includes process information, and the unfreezing event is used to trigger an unfreezing operation to be performed on some processes in a frozen application; and the processor is configured to: determine the some processes in the target application based on a correspondence between an application and a process and the process information, and perform an unfreezing operation on the some processes.

In a possible embodiment, the processor is configured to: before determining the some processes in the target application based on the correspondence between an application and a process and the process information, and performing the unfreezing operation on the some processes, determine, based on the correspondence between an application and a process and the process information, the target application corresponding to the process information.

In a possible embodiment, when the unfreezing event further includes an application identifier, where the application identifier is used to identify the application corresponding to the process information, the processor is configured to: before determining the some processes in the target application based on the correspondence between an application and a process and the process information, and performing the unfreezing operation on the some processes, determine the target application corresponding to the application identifier.

In a possible embodiment, the processor is specifically configured to: when determining that the unfreezing event satisfies an unfreezing condition of the some processes, determine the some processes in the target application based on the correspondence between an application and a process and the process information, and perform the unfreezing operation on the some processes.

In a possible embodiment, the unfreezing condition of the some processes includes at least N of the following conditions, where N is a natural number;
  the unfreezing event is not a tapping event;
  a type of the unfreezing event does not belong to a highly user-perceived type; and
  the application corresponding to the unfreezing event is not included in a prediction application set, where the prediction application set includes at least one application to be used by a user.

In a possible embodiment, the processor is further configured to: obtain, based on a correspondence between a process and a resource and the process information of the some processes, a resource corresponding to at least one of the some processes, and allocate the resource to the at least one process.

In a possible embodiment, the processor is further configured to: when resources corresponding to the some processes are not obtained based on the correspondence between a process and a resource and the process information of the some processes, obtain, based on a correspondence between an application and a resource and the application identifier, a resource corresponding to the target application, and allocate the resource to the target application.

In a possible embodiment, the tapping event includes any one of a desktop icon tapping event, a notification bar tapping event, a recent-task-list tapping event, and a lock screen tapping event.

In a possible embodiment, the highly user-perceived type includes an alarm clock application triggering type or a music application timed playback type.

In a possible embodiment, the unfreezing event includes any one of a tapping event, a system broadcast event, and an application timed reminder event.

In a possible embodiment, the process information is a process ID.

For beneficial effects of the terminal device provided in the second aspect and the possible embodiments of the second aspect, refer to the beneficial effects brought by the first aspect and the possible implementations of the first aspect. Details are not described herein again.

According to a third aspect, an embodiment provides an application management apparatus, including:
  an obtaining module, configured to obtain an unfreezing event, where the unfreezing event includes process information, and the unfreezing event is used to trigger an unfreezing operation to be performed on some processes in a frozen application;
  a determining module, configured to determine the some processes in the target application based on a correspondence between an application and a process and the process information; and
  an unfreezing module, configured to perform an unfreezing operation on the some processes.

In a possible embodiment, the determining module is configured to: before the some processes in the target application are determined based on the correspondence between an application and a process and the process information, and the unfreezing operation is performed on the some processes, determine, based on the correspondence between an application and a process and the process information, the target application corresponding to the process information. In a possible embodiment, when the unfreezing event further includes an application identifier, where the application identifier is used to identify the application corresponding to the process information, the determining module is configured to: before the some processes in the target application are determined based on the correspondence between an application and a process and the process information, and the unfreezing operation is performed on the some processes, determine the target application corresponding to the application identifier.

In a possible embodiment, the determining module is specifically configured to: when determining that the unfreezing event satisfies an unfreezing condition of the some processes, determine the some processes in the target application based on the correspondence between an application and a process and the process information, and perform the unfreezing operation on the some processes.

In a possible embodiment, the unfreezing condition of the some processes includes at least N of the following conditions, where N is a natural number;
  the unfreezing event is not a tapping event;
  a type of the unfreezing event does not belong to a highly user-perceived type; and
  the application corresponding to the unfreezing event is not included in a prediction application set, where the prediction application set includes at least one application to be used by a user.

In a possible embodiment, the obtaining module is further configured to: obtain, based on a correspondence between a process and a resource and the process information of the some processes, a resource corresponding to at least one of the some processes; and
  the application management apparatus further includes: a first allocation module, configured to allocate the resource to the at least one process.

In a possible embodiment, the obtaining module is further configured to: when resources corresponding to the some processes are not obtained based on the correspondence between a process and a resource and the process information of the some processes, obtain, based on a correspondence between an application and a resource and the application identifier, a resource corresponding to the target application; and the application management apparatus further includes: a second allocation module, configured to allocate the resource to the target application.

In a possible embodiment, the tapping event includes any one of a desktop icon tapping event, a notification bar tapping event, a recent-task-list tapping event, and a lock screen tapping event.

In a possible embodiment, the highly user-perceived type includes an alarm clock application triggering type or a music application timed playback type.

In a possible embodiment, the unfreezing event includes any one of a tapping event, a system broadcast event, and an application timed reminder event.

In a possible embodiment, the process information is a process ID.

For beneficial effects of the terminal device provided in the third aspect and the possible embodiments of the third aspect, refer to the beneficial effects brought by the first aspect and the possible implementations of the first aspect. Details are not described herein again.

According to a fourth aspect, an exemplary embodiment provides a terminal device, including a memory and a processor, where the memory is configured to store a program instruction; and the processor is configured to invoke the program instruction in the memory to perform the application management method in any one of the first aspect or the possible embodiments of the first aspect.

According to a fifth aspect, an exemplary embodiment provides a readable storage medium. The readable storage medium stores an executable instruction. When at least one processor in a terminal device executes the executable instruction, the terminal device is enabled to perform the application management method in any one of the first aspect or the possible embodiments of the first aspect.

According to a sixth aspect, an exemplary embodiment provides a program product. The program product includes an executable instruction, where the executable instruction is stored in a readable storage medium. At least one processor in a terminal device may read the executable instruction from the readable storage medium. The at least one processor executes the executable instruction, so that the terminal device performs the application management method in any one of the first aspect or the possible embodiments of the first aspect.

According to a seventh aspect, an exemplary embodiment provides a chip. The chip is connected to a memory, or the chip is integrated with a memory. When a software program stored in the memory is executed, the application management method in any one of the possible embodiments is implemented.

According to an eighth aspect, an exemplary embodiment provides an application management method, including: obtaining an unfreezing event, where the unfreezing event includes process information, and the unfreezing event is used to trigger an unfreezing operation to be performed on some processes in a frozen application; and performing an unfreezing operation on the some processes based on the process information. For other implementations of this aspect, refer to the first aspect to the seventh aspect. Details are not described herein again.

According to the application management method and apparatus, and the device that are provided in the embodiments, the unfreezing event including the process information is obtained, where the unfreezing event may indicate to trigger the unfreezing operation to be performed on the some processes in the frozen application; and the some processes in the target application are determined based on the correspondence between an application and a process and the process information, and the unfreezing operation is performed on the some processes. In this way, normal running of the target application is implemented, so that the target application can perform corresponding processing; and there is no need to perform an unnecessary unfreezing operation on other processes in the target application or the entire target application, so that problems such as resource preemption, a waste of power, and deterioration in running performance of an application that are caused by repeated unfreezing and freezing of the application are resolved. This reduces operation frequency of repeated unfreezing and freezing of the application, and increases a freezing rate of the application, thereby reducing system power consumption of the terminal device, and optimizing system performance of the terminal device.

DESCRIPTION OF EMBODIMENTS

Figure 1:
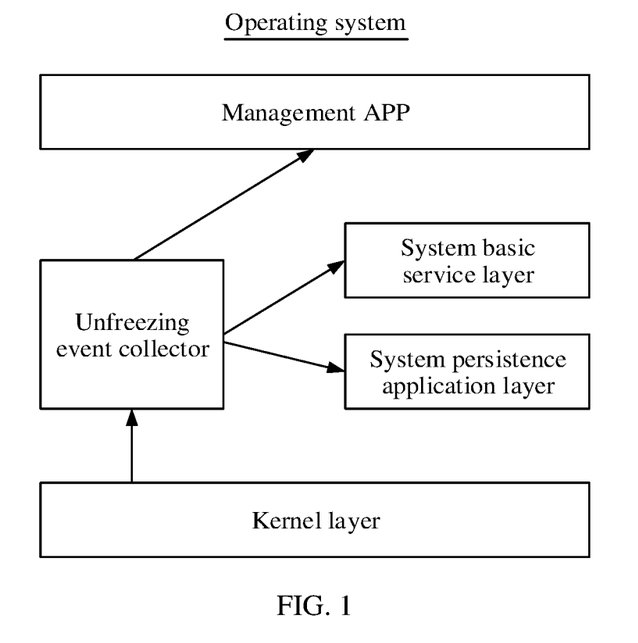
FIG. 1 is a schematic diagram of a software architecture of an operating system.

FIG. 1 is a schematic diagram of a software architecture of an operating system. As shown in FIG. 1, the operating system in an exemplary embodiment may include a kernel layer, a system basic service layer, a system persistence application layer, an unfreezing event collector, and a management app. The kernel layer is mainly responsible for reporting of an unfreezing event of a network data packet, and may report the unfreezing event to the unfreezing event collector. The system basic service layer is mainly responsible for reporting of events such as a timed reminder event and a process exit event, and may report the events to the unfreezing event collector. The system persistence application layer is mainly responsible for reporting of events such as an application interface start event, and may report the events to the unfreezing event collector. The unfreezing event collector is mainly responsible for collecting events from the kernel layer, the system basic service layer, and the system persistence application layer, and sends the events to the management app. The management app is mainly responsible for receiving the events from the unfreezing event collector and making processing decisions on the events.

The operating system may include but is not limited to an Android native operating system, and the operating system may be applied to a terminal device, and therefore the terminal device can obtain an event and perform an operation on the event, for example, perform a freezing operation and an unfreezing operation.

The terminal device in an exemplary embodiment may be a wireless terminal or a wired terminal. The wireless terminal may be a device that provides a user with voice and/or connectivity of other service data, for example, a handheld device with a wireless connection function, or another processing device connected to a wireless modem. The wireless terminal may communicate with one or more core networks by using a RAN. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, and exchanges voice and/or data with the RAN. For example, the wireless terminal may be a device such as a PCS phone, a cordless telephone set, an SIP phone, a WLL station, a PDA, an artificial intelligence device, or a vehicle-mounted apparatus. The wireless terminal may also be referred to as a system, a subscriber unit, a subscriber station, a mobile station, a mobile console, a remote station, a remote terminal, an access terminal, a user terminal, a user agent, or user equipment (User Device). This is not limited herein. A person skilled in the art can understand that a multi-process mechanism is usually used for an application. For example, when one application is enabled, a plurality of active processes are usually started. For example, a communication application such as WeChat includes approximately five active processes, a playback software application such as iQiYi includes approximately nine active processes, and an entertainment gossip application such as Headlines Today includes approximately seven active processes.

During actual application of an Android native operating system, the management app in the operating system may perform an unfreezing operation on an application, and usually performs the unfreezing operation on a per application basis. For example, when at least one of the following events occurs: a non-proxy system broadcast event, a system broadcast over-limit event, a foreground event, an event in which there is a network data packet in instant messaging or the like, and a subprocess exit event, the foregoing event may trigger the management app in the operating system to activate an unfreezing mechanism, to enable the management app in the operating system to decide, according to the unfreezing mechanism, whether to perform an unfreezing operation on an application. When determining that an unfreezing operation needs to be performed on an application, the management app in the operating system can perform an unfreezing operation on the entire frozen application, so that the application that is allowed to be unfrozen can process the foregoing event. In addition, within specific duration after the application completes processing of the foregoing event, the management app in the operating system can continue to perform a freezing operation on the application, to reduce system power consumption of the terminal device and optimize system performance of the terminal device.

If the foregoing event occurs frequently, the management app in the operating system repeatedly performs an unfreezing operation and a freezing operation on the application, and the application cannot re-enter a frozen state within specific duration after the application is unfrozen. As a result, the application cannot be kept in a constant frozen state, that is, the application "cannot be frozen", and a freezing operation even fails in a serious situation.

In this case, it is likely that an application switched to a background preempts a resource of an application working in a foreground. This deteriorates running performance of the application working in the foreground, and causes unnecessary power consumption of the application working in the foreground. Moreover, after the application switched to the background is frozen, an empty process included in the application switched to the background needs to exit before being reclaimed, and consequently the operating system needs to perform an unfreezing operation on the application. After the process exits, the process is started by another process in the application, and then the operating system performs a freezing operation on the unfrozen application after a period of time. After the application is frozen, the process becomes an empty process again and then is reclaimed. In this case, the application is unfrozen and frozen repeatedly, resulting in unnecessary power consumption of the application switched to the background. For example, applications such as Taobao and Baidu have the foregoing problems.

Because the management app in the operating system needs to perform an unfreezing operation only on some processes in the application, the application can complete processing of the foregoing event, and the management app does not need to perform an unfreezing operation on the entire application. Therefore, to resolve the foregoing problems, an exemplary embodiment provides an application management method and apparatus, a device, and a storage medium, so that an unfreezing operation on some processes in an application can be implemented, and the application in which the some processes are unfrozen can process an event. In this way, problems such as resource preemption, a waste of power, and deterioration in running performance of an application that are caused by repeated unfreezing and freezing of the application are resolved. This reduces operation frequency of repeated unfreezing and freezing of the application, and increases a freezing rate of the application, thereby reducing system power consumption of a terminal device, and optimizing system performance of the terminal device.

Figure 2:
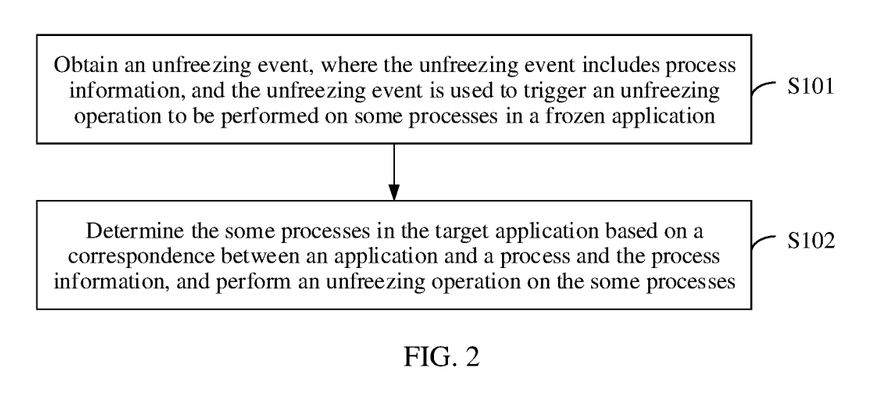
FIG. 2 is a flowchart of an embodiment of an application management method.

The following details an exemplary implementation process of the application management method in an exemplary embodiment with reference to FIG. 2 by using a terminal device as an execution body in an exemplary embodiment.

FIG. 2 is a flowchart of an embodiment of an application management method. As shown in FIG. 2, the application management method in this embodiment may include the following steps.

In step S101, an exemplary embodiment may obtain an unfreezing event, where the unfreezing event includes process information, and the unfreezing event is used to trigger an unfreezing operation to be performed on some processes in a frozen application.

In an exemplary embodiment, the terminal device may use the operating system shown in FIG. 1, and use the management app in the operating system to obtain the unfreezing event. Different applications may include different processes such as a drawing process and a receiving/sending process, and process information of the processes is also different, where the process information is information that uniquely identifies the process. Therefore, the process information not only can uniquely identify the process, but also can uniquely identify a corresponding application. Due to different unfreezing events, unfreezing mechanisms activated by the management app in the operating system are different. Therefore, when the unfreezing event includes the process information, the unfreezing event may be used to trigger the management app in the system to determine to activate a corresponding unfreezing mechanism used for performing the unfreezing operation on the some processes in the frozen application.

The process information in an exemplary embodiment may be corresponding to one or more processes. A quantity of processes included in the process information is not limited in an exemplary embodiment. In addition, the process information may be in any one or any combination of forms: a number, code, an identifier, or the like. Optionally, the process information may be a process ID (process identifier, PID), where the PID is a value that uniquely identifies a process. For example, the process information may include a PID 1, or may include a PID 1 and a PID 2.

In step S102, an exemplary embodiment may determine the some processes in the target application based on a correspondence between an application and a process and the process information, and perform an unfreezing operation on the some processes.

In an exemplary embodiment, the management app in the operating system can identify an application installed in the terminal device and a process included in the application. Therefore, the management app in the operating system may prestore the correspondence between an application and a process in a form of a table, a set, a matrix, or the like. An exemplary implementation of storing the correspondence between an application and a process is not limited in an exemplary embodiment.

For example, the management app in the operating system may store the correspondence between an application and a process in a tabular form. For example, Table 1 stores all applications installed in the terminal device and application identifiers of the applications. An application identifier is a unique identifier of an application, and the application identifier may be in a form of a number, code, an identifier, or the like. For example, in Table 1, a "numeral 1" application identifier represents a WeChat application, a "numeral 2" application identifier represents an iQiYi application, and a "numeral 3" application identifier represents a Headlines Today application. Respective processes included in the WeChat application, the iQiYi application, and the Headlines Today application are different, and therefore an exemplary embodiment may use three tables to store the respective processes included in the three applications. For ease of description, process information of all processes included in an application (such as the WeChat application) represented by the "numeral 1" application identifier in Table 2 is illustrated. For example, in Table 2, "numeral 1" process information represents a drawing process, and "numeral 2" process information represents a receiving/sending process.

TABLE 1

| Application identifier | Application name |
|---|---|
| 1 | WeChat |
| 2 | iQiYi |
| 3 | Headlines Today |
| . . . | . . . |

TABLE 2

| Application identifier | Process information | Process name |
|---|---|---|
| 1 | 1 | Drawing |
|  | 2 | Receiving/sending |
|  | . . . | . . . |

Further, process information is information that uniquely identifies a process, and applications include different processes. Therefore, based on the correspondence between an application and a process and the process information, the management app in the operating system not only can determine the target application corresponding to the process information, but also can determine the some processes in the target application.

Quantities of target applications and some processes may be determined based on the process information. This is not limited in an exemplary embodiment. Usually, when the process information is corresponding to one process, there is one target application. When the process information is corresponding to a plurality of processes, and a case in which some of these processes are processes in a same application does not exist, a quantity of target applications is equal to a quantity of processes. When the process information is corresponding to a plurality of processes, and a case in which some of these processes are processes in a same application exists, a quantity of target applications is less than a quantity of processes.

It should be noted that, the management app in the operating system can determine, based on the correspondence between an application and a process and the process information, the target application corresponding to the process information. Alternatively, if the unfreezing event includes an application identifier and the process information, and the application identifier is used to identify the application corresponding to the process information, for example, the application corresponding to the process information is the WeChat application and the application identifier is an application identifier of the WeChat application, the management app in the operating system can determine, based on the application identifier, the target application corresponding to the application identifier.

Further, the management app in the operating system may perform the unfreezing operation on the determined some processes according to the unfreezing mechanism, and the unfrozen some processes enable the target application to run and perform corresponding processing; and there is no need to perform an unnecessary unfreezing operation on other processes in the target application or the entire target application, so that resource preemption, a waste of power, and deterioration in performance of an application are avoided.

According to the application management method provided in an exemplary embodiment, the unfreezing event including the process information is obtained, where the unfreezing event may indicate to trigger the unfreezing operation to be performed on the some processes in the frozen application; and the some processes in the target application are determined based on the correspondence between an application and a process and the process information, and the unfreezing operation is performed on the some processes. In this way, normal running of the target application is implemented, so that the target application can perform corresponding processing; and there is no need to perform an unnecessary unfreezing operation on other processes in the target application or the entire target application, so that problems such as resource preemption, a waste of power, and deterioration in running performance of an application that are caused by repeated unfreezing and freezing of the application are resolved. This reduces operation frequency of repeated unfreezing and freezing of the application, and increases a freezing rate of the application, thereby reducing system power consumption of the terminal device, and optimizing system performance of the terminal device.

For example, based on the embodiment shown in FIG. 2, when the management app in the operating system obtains the unfreezing event, even though the unfreezing event is used to trigger the unfreezing operation to be performed on the some processes in the frozen application, some events still enable the management app in the operating system to perform an unfreezing operation on the entire target application. Therefore, to accurately determine whether the unfreezing event is used to perform an unfreezing operation on the entire application or the some processes in the application, in an exemplary implementation of step S102, optionally, when the management app in the operating system determines that the unfreezing event satisfies an unfreezing condition of the some processes, the management app may determine the some processes in the target application based on the correspondence between an application and a process and the process information, and perform the unfreezing operation on the some processes.

The unfreezing condition of the some processes is a condition for triggering the unfreezing operation to be performed on the some processes in the application.

Optionally, the unfreezing condition of the some processes includes at least N of the following conditions, where N is a natural number;
 the unfreezing event is not a tapping event;
 a type of the unfreezing event does not belong to a highly user-perceived type; and
 the application corresponding to the unfreezing event is not included in a prediction application set, where the prediction application set includes at least one application to be used by a user.

In an exemplary embodiment, the tapping event may be an event in which a frozen application is switched from a background to a foreground through a tapping operation performed by a user and the application is displayed to the user by using the foreground. A specific type of the tapping event is not limited in an exemplary embodiment. Optionally, the tapping event may include any one of a desktop icon tapping event, a notification bar tapping event, a recent-task-list tapping event, and a lock screen tapping event.

In an exemplary embodiment, the desktop icon tapping event is an unfreezing event that is triggered by tapping on an application on a desktop of the terminal device by the user. The notification bar tapping event is an unfreezing event that is triggered by tapping on an application in a notification bar of the terminal device by the user. The recent-task-list tapping event is an unfreezing event that is triggered by tapping on an application in a recent task list of the terminal device by the user. The lock screen tapping event is an unfreezing event that is triggered by tapping on a lock screen application of the terminal device by the user.

Because the tapping event is an event in which the user needs to perform a corresponding operation in the foreground, the management app in the operating system needs to switch the application corresponding to the tapping event from the background to the foreground. Then, when determining that the unfreezing event is a tapping event, the management app in the operating system may perform the unfreezing operation on the target application. When determining that the unfreezing event is not a tapping event, the management app in the operating system may perform the unfreezing operation on the some processes in the target application.

In an exemplary embodiment, the highly user-perceived type is an event in which the user presets a use moment or use duration of an application. An exemplary implementation form of the highly user-perceived type is not limited in an exemplary embodiment. Optionally, the highly user-perceived type may include an alarm clock application triggering type or a music application timed playback type.

For example, when the type of the unfreezing event is an alarm clock application triggering type, the unfreezing event is a highly perceived unfreezing event that is triggered when an alarm clock application in the terminal device needs to be used at a current moment. When the type of the unfreezing event is a music application timed playback type, the unfreezing event is a highly perceived unfreezing event that is triggered when a music application in the terminal device needs to be used at a current moment.

Because the unfreezing event corresponding to the highly user-perceived type is an event in which an application needs to be used at a current moment, the management app in the operating system needs to switch the application corresponding to the unfreezing event corresponding to the highly user-perceived type from a background to a foreground. Then, when determining that the type of the unfreezing event is a highly user-perceived type, the management app in the operating system may perform the unfreezing operation on the target application. When determining that the type of the unfreezing event is not a highly user-perceived type, the management app in the operating system may perform the unfreezing operation on the some processes in the target application.

In an exemplary embodiment, the prediction application set includes at least one application to be used by the user, that is, TopN applications, where N is a positive integer. An exemplary implementation form of the prediction application set is not limited in an exemplary embodiment. The TopN applications are usually first N applications that are predicted to be used by the user in a foreground, based on habits of the user within specific duration by using algorithms such as softmax and logistic regression.

Because the TopN applications are the application to be used by the user in the foreground, the management app in the operating system requires that the TopN applications should be switched from a background to the foreground. Then, the management app in the operating system may perform the unfreezing operation on the target application when the application corresponding to the unfreezing event is included in the prediction application set (that is, the TopN applications). The management app in the operating system may perform the unfreezing operation on the some processes in the target application when the application corresponding to the unfreezing event is not included in the prediction application set (that is, the TopN applications).

It should be noted that the management app in the operating system may determine whether the unfreezing event satisfies any one of the foregoing conditions or may determine whether the unfreezing event satisfies any combination of the foregoing conditions. This is not limited in an exemplary embodiment. In addition, when obtaining the unfreezing event in a default state, the management app in the operating system usually determines to perform the unfreezing operation on the some processes in the target application. In other words, the management app in the operating system may not determine whether the unfreezing event satisfies any one of the foregoing conditions.

According to the application management method provided in an exemplary embodiment, when the unfreezing event satisfies the unfreezing condition of the some processes, the management app in the operating system may determine the some processes in the target application, and perform the unfreezing operation on the some processes in the target application; or when the unfreezing event does not satisfy the unfreezing condition of the some processes, the management app may determine the target application, and perform the unfreezing operation on the target application. In this way, an object on which the unfreezing operation is to be performed is determined in a timely and accurate manner, and that the application cannot normally run because of a misoperation is avoided.

With reference to FIG. 1, when the management app in the operating system performs a freezing operation on an application, to ensure that the application does not run and reduce power consumption caused by use of resources, the management app may serve as a proxy to manage (that is, temporarily reclaim) a resource that needs to be used by the application before the application is frozen, so that the frozen application does not continue to occupy the resource. This avoids that resource utilization is reduced because the resource cannot be properly utilized. A resource type of the resource may include but is not limited to a global positioning system (GPS), a network, a service, Bluetooth, and wireless fidelity (Wi-Fi).

A person skilled in the art can understand that different applications may use different resources. For example, an application 1 may use a resource A and does not use a resource B; an application 2 may use the resource B and does not use the resource A; an application 3 may use the resource A and the resource B; and an application 4 may not use the resource A and the resource B. With reference to the foregoing process, the management app in the operating system may usually prestore a correspondence between an application and a resource in a form of a table, a set, a matrix, or the like. An exemplary implementation of storing the correspondence between an application and a resource is not limited in an exemplary embodiment.

For example, the management app in the operating system may store the correspondence between an application and a resource in a tabular form. For example, the correspondence between an application and a resource is illustrated by using an example in which the application 1, the application 2, the application 3, and the application 4 use the resource A and the resource B in Table 3. In Table 3, an application identifier of the application 1 is 1, an application identifier of the application 2 is 2, an application identifier of the application 3 is 3, and an application identifier of the application 4 is 4. Because the application 4 does not use the resource A and the resource B, there is no correspondence between the application 4 and the resource A and between the application 4 and the resource B in Table 3.

TABLE 3

| Application identifier | Resource Type |
|---|---|
| 1 | Resource A |
| 2 | Resource B |
| 3 | Resource A |
| 3 | Resource B |

It should be noted that the correspondence between an application and a resource indicates a resource type of a resource used by an application, and may further indicate a resource amount of the resource used by the application. For example, one column is added to Table 3, and represents that a resource amount of the resource A that can be used by the application 1 is X; a resource amount of the resource B that can be used by the application 2 is Y; and a resource amount of the resource A that can be used by the application 3 is M, and a resource amount of the resource B that can be used by the application 3 is N.

A person skilled in the art can also understand that for any application, different processes may use different resources. For example, an application includes a process 1, a process 2, a process 3, and a process 4. The process 1 may use a resource A and does not use a resource B; the process 2 may use the resource B and does not use the resource A; the process 3 may use the resource A and the resource B; and the process 4 may not use the resource A and the resource B. With reference to the foregoing process, the management app in the operating system may also prestore a correspondence between a process and a resource in a form of a table, a set, a matrix, or the like. A specific implementation of storing the correspondence between a process and a resource is not limited in an exemplary embodiment.

For example, the management app in the operating system may store the correspondence between a process and a resource in a tabular form. For example, the correspondence between a process and a resource is illustrated by using an example in which the process 1, the process 2, the process 3, and the process 4 use the resource A and the resource B in Table 4. In Table 4, process information of the process 1 is a PID 1, process information of the process 2 is a PID 2, process information of the process 3 is a PID 3, and process information of the process 4 is a PID 4. Because the process 4 does not use the resource A and the resource B, there is no correspondence between the process 4 and the resource A and between the process 4 and the resource B in Table 4.

TABLE 4

| PID | Resource Type |
|---|---|
| 1 | Resource A |
| 2 | Resource B |
| 3 | Resource A |
| 3 | Resource B |

It should be noted that the correspondence between a process and a resource indicates a resource type of a resource used by a process, and may further indicate a resource amount of the resource used by the process. For example, one column is added to Table 4, and represents that a resource amount of the resource A that can be used by the process is X; a resource amount of the resource B that can be used by the process 2 is Y; and a resource amount of the resource A that can be used by the process 3 is M, and a resource amount of the resource B that can be used by the process 3 is N.

Further, the specific implementations of prestoring the correspondence between a process and a resource and the relationship between an application and a resource are not limited in an exemplary embodiment. To properly utilize storage space, when a process in an application needs to use a resource, the management app in the operating system not only stores a correspondence between the application and the resource, but also stores a correspondence between the process in the application and the resource. When an entire application needs to use a resource and that any process in the application needs to use a resource cannot be determined, the management app in the operating system stores only a correspondence between the application and the resource, and does not store a correspondence between a process in the application and the resource.

With reference to the foregoing process, based on the embodiment shown in FIG. 2, after the management app in the operating system performs the unfreezing operation on the some processes in the target application, if one or more processes in the some processes use a resource before being frozen, the management app needs to allocate the resource only to the one or more processes. In this case, for example, an exemplary process of the application management method in this embodiment is detailed with reference to FIG. 3.

Figure 3:
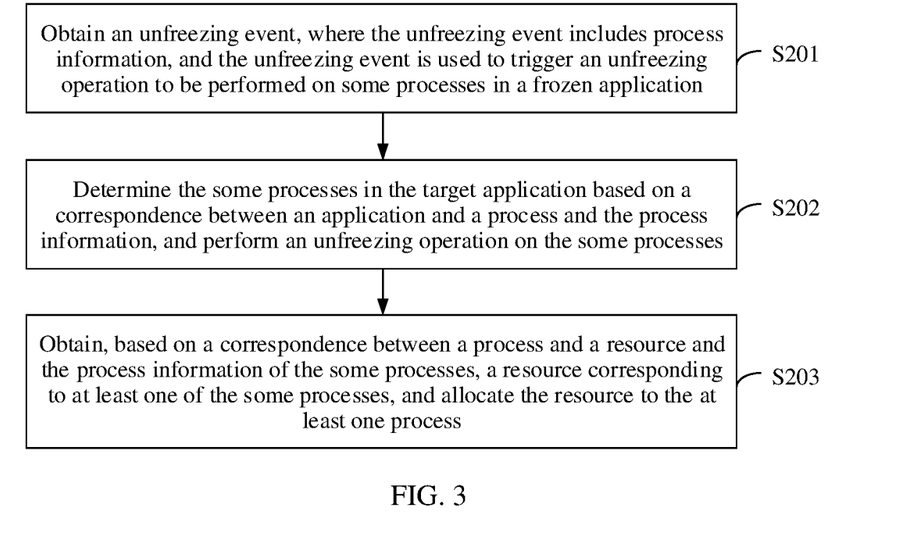
FIG. 3 is a flowchart of an embodiment of an application management method.

FIG. 3 is a flowchart of an embodiment of an application management method. As shown in FIG. 3, the application management method in this embodiment may include the following steps.

In step S201, an exemplary embodiment may obtain an unfreezing event, where the unfreezing event includes process information, and the unfreezing event is used to trigger an unfreezing operation to be performed on some processes in a frozen application.

In step S202, an exemplary embodiment may determine the some processes in the target application based on a correspondence between an application and a process and the process information, and perform an unfreezing operation on the some processes.

Exemplary implementations of steps S201 and S202 are respectively similar to those of steps S101 and S102 in the embodiment in FIG. 2. Details are not described in this embodiment again.

In step S203, an exemplary embodiment may obtain, based on a correspondence between a process and a resource and the process information of the some processes, a resource corresponding to at least one of the some processes, and allocate the resource to the at least one process.

In an exemplary embodiment, the management app in the operating system may determine a resource use status of any one of the some processes based on the correspondence between a process and a resource and the process information of the some processes. The resource use status of the any one process may include a resource type of a resource, or may include a resource type and a resource amount of a resource. This is not limited in an exemplary embodiment.

Further, when only one process in the some processes uses a resource, the management app in the operating system may obtain the resource used by the process, and allocate the resource to the process, but does not allocate a resource to a process in the some processes other than the process. In this way, the process can use the resource, so that the target application normally runs and performs a corresponding operation. When a plurality of processes in the some processes use resources, the management app in the operating system may obtain respective resources used by the processes, and allocate, to the processes, the respective resources corresponding to the processes, but does not allocate a resource to a process in the some processes other than the foregoing processes. In this way, all the foregoing processes can use the respective resources corresponding to the foregoing processes, so that the target application normally runs and performs a corresponding operation.

For example, when the some processes include a process 1 and a process 2, and the management app in the operating system stores a correspondence between the process 1 and a resource A and a correspondence between the process 2 and a resource B, the management app in the operating system may allocate the resource A to the process 1 and allocate the resource B to the process 2, but does not need to allocate the resource B to the process 1 and does not need to allocate the resource A to the process 2.

According to the application management method provided in an exemplary embodiment, after the unfreezing operation is performed on the some processes in the target application, the resource corresponding to the at least one of the some processes may be obtained based on the correspondence between a process and a resource and the process information of the some processes, and the resource may be allocated to the at least one process, so that the at least one process can accurately obtain the corresponding resource, and no other resource needs to be allocated to the at least one process. This implements intelligent resource allocation, and reduces required system resources to the utmost, thereby avoiding a waste of resources, and improving resource allocation efficiency and utilization.

With reference to the foregoing process, based on the embodiment shown in FIG. 2, after the management app in the operating system performs the unfreezing operation on the some processes in the target application, if the target application uses a resource before being frozen and a specific resource use status of the some processes cannot be determined, the management app needs to allocate the resource to the target application. In this case, for example, an exemplary process of the application management method in this embodiment is detailed with reference to FIG. 4.

Figure 4:
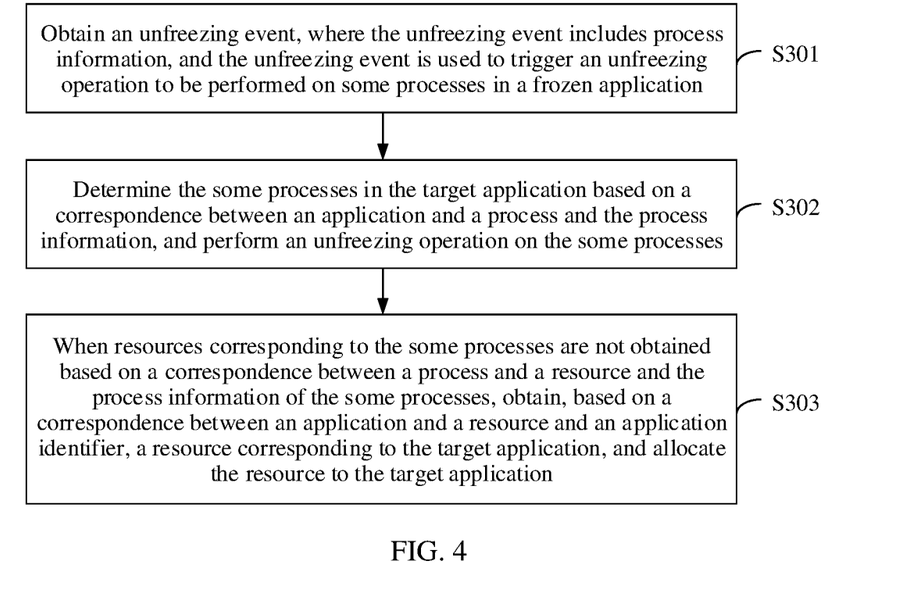
FIG. 4 is a flowchart of an embodiment of an application management method.

FIG. 4 is a flowchart of an embodiment of an application management method. As shown in FIG. 4, the application management method in this embodiment may include the following steps.

In step S301, an exemplary embodiment may obtain an unfreezing event, where the unfreezing event includes an application identifier and process information, and the unfreezing event is used to trigger an unfreezing operation to be performed on some processes in a frozen application.

In step S302, an exemplary embodiment may determine the some processes in the target application based on a correspondence between an application and a process and the process information, and perform an unfreezing operation on the some processes.

Specific implementations of steps S301 and S302 are respectively similar to those of steps S101 and S102 in the embodiment in FIG. 2. Details are not described in this embodiment again.

In step S303, when resources corresponding to the some processes are not obtained based on the correspondence between a process and a resource and the process information of the some processes, an exemplary embodiment may obtain, based on a correspondence between an application and a resource and the application identifier, a resource corresponding to the target application, and allocate the resource to the target application.

In an exemplary embodiment, the management app in the operating system may obtain a resource use status of the target application based on the correspondence between an application and a resource and the application identifier. The resource use status of the target application may include a resource type of a resource, or may include a resource type and a resource amount of a resource. This is not limited in an exemplary embodiment.

Further, with reference to FIG. 3, when the management app in the operating system does not obtain, based on the correspondence between a process and a resource and the process information of the some processes, the resources corresponding to the some processes, the management app may allocate, to the target application, the resource used by the target application. In this way, the target application may use the resource, to implement normal running and perform a corresponding operation.

For example, when the some processes include a process 1 and a process 2, and the management app in the operating system stores only a correspondence between the target application and a resource A, but does not store a correspondence between the process 1 and the resource A and a correspondence between the process 2 and the resource A, the management app in the operating system may allocate, to the target application, the resource A required by the target application.

According to the application management method provided in an exemplary embodiment, after the unfreezing operation is performed on the some processes in the target application, because the resources corresponding to the some processes cannot be obtained based on the correspondence between a process and a resource and the process information of the some processes, the resource corresponding to the target application may be obtained based on the correspondence between an application and a resource and the application identifier, and the resource may be allocated to the target application. In this way, the target application can obtain the corresponding resource in a timely and accurate manner for normal running, thereby improving resource allocation efficiency.

With reference to FIG. 3 and FIG. 4, in a specific embodiment, an exemplary process of implementing resource allocation by using the application management method in an exemplary embodiment may include the following steps.

In step 1, the management app in the operating system obtains an unfreezing event, where the unfreezing event includes process information, and the unfreezing event is used to trigger an unfreezing operation to be performed on some processes in a frozen application.

In step 2, the management app in the operating system determines the some processes in the target application based on a correspondence between an application and a process and the process information, and performs an unfreezing operation on the some processes.

In step 3, the management app in the operating system determines, based on a correspondence between an application and a resource and an application identifier, whether there is a corresponding resource to be used by the target application.

In step 41, when obtaining, based on a correspondence between a process and a resource and the process information of the some processes, a resource corresponding to at least one of the some processes, the management app in the operating system allocates the resource to the at least one process.

In step 42, when the management app in the operating system does not obtain, based on a correspondence between a process and a resource and the process information of the some processes, resources corresponding to the some processes, the management app obtains the resource corresponding to the target application, and allocates the resource to the target application.

Figure 5:
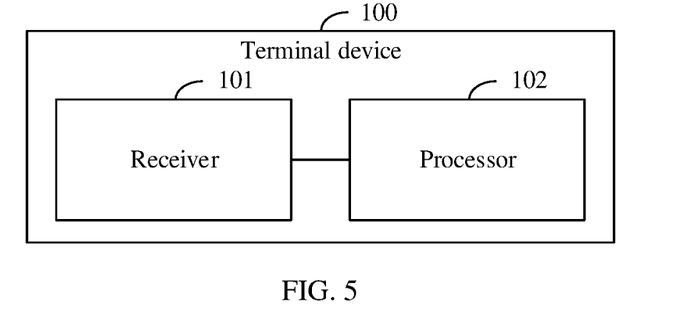
FIG. 5 is a schematic structural diagram of a terminal device.

For example, an embodiment further provides a terminal device. FIG. 5 is a schematic structural diagram of a terminal device. As shown in FIG. 5, the terminal device 100 may be a device that uses the operating system shown in FIG. 1 and that has functions of obtaining an unfreezing event and performing an unfreezing operation on an application or a process in the application, and is configured to implement operations corresponding to the terminal device in any one of the foregoing method embodiments.

The terminal device 100 in an exemplary embodiment may be a wireless terminal or a wired terminal. The wireless terminal may be a device that provides a user with voice and/or connectivity of other service data, for example, a handheld device with a wireless connection function, or another processing device connected to a wireless modem. The wireless terminal may communicate with one or more core networks by using a RAN. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, and exchanges voice and/or data with the RAN. For example, the wireless terminal may be a device such as a PCS phone, a cordless telephone set, an SIP phone, a WLL station, or a PDA. The wireless terminal may also be referred to as a system, a subscriber unit, a subscriber station, a mobile station, a mobile console, a remote station, a remote terminal, an access terminal, a user terminal, a user agent, or user equipment (User Device). This is not limited herein.

The terminal device 100 in this embodiment may include a receiver 101 and a processor 102. The receiver 101 is, for example, a port module, and may communicate with another device through an optical port, an electrical port, or a combination of an optical port and an electrical port. The processor 102 may be an integrated circuit, a field-programmable gate array (FPGA), a chip, or the like. The receiver 101 is connected to the processor 102, where the receiver 101 is configured to obtain an unfreezing event, where the unfreezing event includes process information, and the unfreezing event is used to trigger an unfreezing operation to be performed on some processes in a frozen application; and the processor 102 is configured to: determine the some processes in the target application based on a correspondence between an application and a process and the process information, and perform an unfreezing operation on the some processes.

In some embodiments, the processor 102 is configured to: before determining the some processes in the target application based on the correspondence between an application and a process and the process information, and performing the unfreezing operation on the some processes, determine, based on the correspondence between an application and a process and the process information, the target application corresponding to the process information.

In some embodiments, when the unfreezing event further includes an application identifier, where the application identifier is used to identify the application corresponding to the process information, the processor 102 is configured to: before determining the some processes in the target application based on the correspondence between an application and a process and the process information, and performing the unfreezing operation on the some processes, determine the target application corresponding to the application identifier.

In some embodiments, the processor 102 is configured to: when determining that the unfreezing event satisfies an unfreezing condition of the some processes, determine the some processes in the target application based on the correspondence between an application and a process and the process information, and perform the unfreezing operation on the some processes.

In some embodiments, the unfreezing condition of the some processes includes at least N of the following conditions, where N is a natural number;

the unfreezing event is not a tapping event;

a type of the unfreezing event does not belong to a highly user-perceived type; and the application corresponding to the unfreezing event is not included in a prediction application set, where the prediction application set includes at least one application to be used by a user.

In some embodiments, the processor 102 is further configured to obtain, based on a correspondence between a process and a resource and the process information of the some processes, a resource corresponding to at least one of the some processes, and allocate the resource to the at least one process.

In some embodiments, the processor 102 is further configured to: when resources corresponding to the some processes are not obtained based on the correspondence between a process and a resource and the process information of the some processes, obtain, based on a correspondence between an application and a resource and the application identifier, a resource corresponding to the target application, and allocate the resource to the target application.

In some embodiments, the tapping event includes any one of a desktop icon tapping event, a notification bar tapping event, a recent-task-list tapping event, and a lock screen tapping event.

In some embodiments, the highly user-perceived type includes an alarm clock application triggering type or a music application timed playback type.

In some embodiments, the unfreezing event includes any one of a tapping event, a system broadcast event, and an application timed reminder event.

In some embodiments, the process information is a process ID.

The terminal device in this embodiment may be configured to implement the solutions corresponding to the terminal device in the foregoing method embodiments. An implementation principle and effects thereof are similar to those in the method embodiments, and details are not described herein again.

Figure 6:
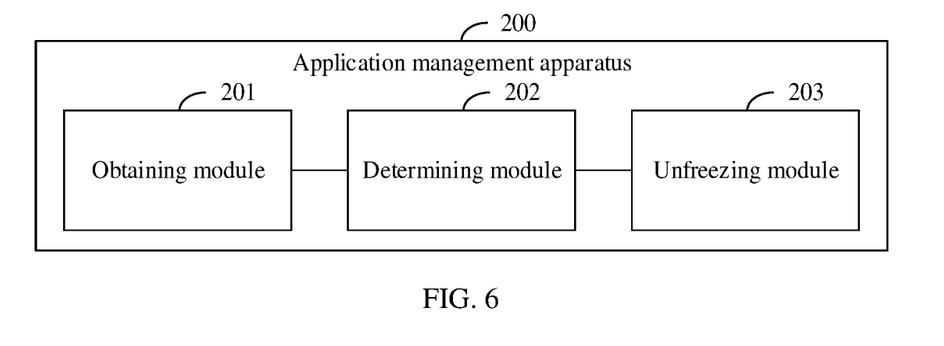
FIG. 6 is a schematic structural diagram of an application management apparatus.

For example, an embodiment further provides an application management apparatus. FIG. 6 is a schematic structural diagram of an application management apparatus. As shown in FIG. 6, the application management apparatus 200 may be a device that uses the operating system shown in FIG. 1 and that has functions of obtaining an unfreezing event and performing an unfreezing operation on an application or a process in the application, and is configured to implement operations corresponding to the terminal device in any one of the foregoing method embodiments.

The terminal device in an exemplary embodiment may be a wireless terminal or a wired terminal. The wireless terminal may be a device that provides a user with voice and/or connectivity of other service data, for example, a handheld device with a wireless connection function, or another processing device connected to a wireless modem. The wireless terminal may communicate with one or more core networks by using a RAN. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, and exchanges voice and/or data with the RAN. For example, the wireless terminal may be a device such as a PCS phone, a cordless telephone set, an SIP phone, a WLL station, or a PDA. The wireless terminal may also be referred to as a system, a subscriber unit, a subscriber station, a mobile station, a mobile console, a remote station, a remote terminal, an access terminal, a user terminal, a user agent, or user equipment (User Device). This is not limited herein.

The application management apparatus 200 in this embodiment may include:

an obtaining module 201, configured to obtain an unfreezing event, where the unfreezing event includes process information, and the unfreezing event is used to trigger an unfreezing operation to be performed on some processes in a frozen application;

a determining module 202, configured to determine the some processes in the target application based on a correspondence between an application and a process and the process information; and an unfreezing module 203, configured to perform an unfreezing operation on the some processes.

In some embodiments, the determining module 202 is configured to: before the some processes in the target application are determined based on the correspondence between an application and a process and the process information, and the unfreezing operation is performed on the some processes, determine, based on the correspondence between an application and a process and the process information, the target application corresponding to the process information.

In some embodiments, when the unfreezing event further includes an application identifier, where the application identifier is used to identify the application corresponding to the process information, the determining module 202 is configured to: before the some processes in the target application are determined based on the correspondence between an application and a process and the process information, and the unfreezing operation is performed on the some processes, determine the target application corresponding to the application identifier.

In some embodiments, the determining module 202 is specifically configured to: when determining that the unfreezing event satisfies an unfreezing condition of the some processes, determine the some processes in the target application based on the correspondence between an application and a process and the process information.

In some embodiments, the unfreezing condition of the some processes includes at least N of the following conditions, where N is a natural number;
the unfreezing event is not a tapping event;
a type of the unfreezing event does not belong to a highly user-perceived type; and
the application corresponding to the unfreezing event is not included in a prediction application set, where the prediction application set includes at least one application to be used by a user.

Figure 7:
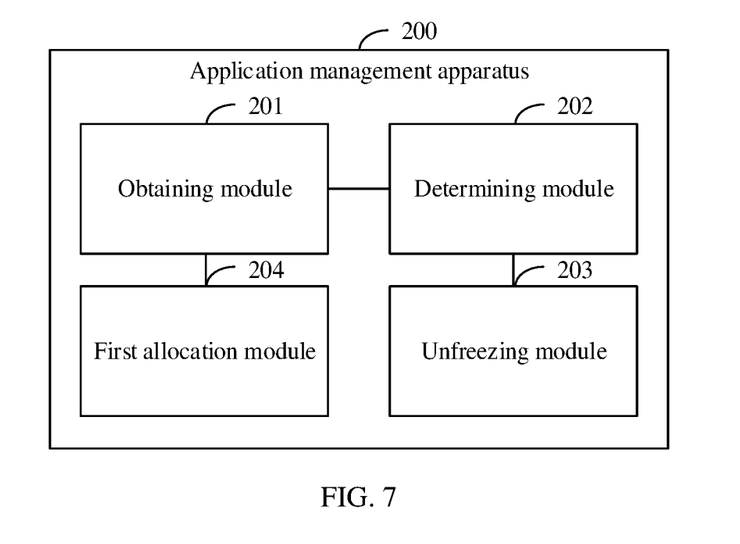
FIG. 7 is a schematic structural diagram of an application management apparatus.

FIG. 7 is a schematic structural diagram of an application management apparatus. As shown in FIG. 7, based on the structure shown in FIG. 6, the application management apparatus 200 in this embodiment may further include:
the obtaining module 201 is further configured to obtain, based on a correspondence between a process and a resource and the process information of the some processes, a resource corresponding to at least one of the some processes; and
a first allocation module 204, configured to allocate the resource to the at least one process.

Figure 8:
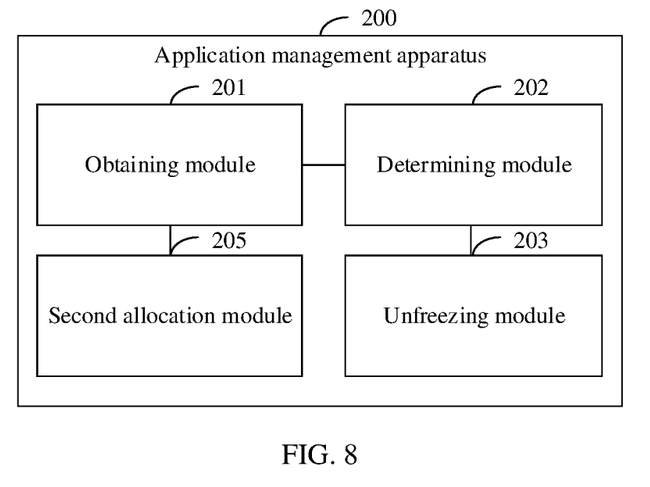
FIG. 8 is a schematic structural diagram of an application management apparatus.

FIG. 8 is a schematic structural diagram of an application management apparatus. As shown in FIG. 8, based on the structure shown in FIG. 6, the application management apparatus 200 in this embodiment may further include:
the obtaining module 201 is further configured to: when resources corresponding to the some processes are not obtained based on the correspondence between a process and a resource and the process information of the some processes, obtain, based on a correspondence between an application and a resource and the application identifier, a resource corresponding to the target application; and a second allocation module 205, configured to allocate the resource to the target application.

In some embodiments, the tapping event includes any one of a desktop icon tapping event, a notification bar tapping event, a recent-task-list tapping event, and a lock screen tapping event.

In some embodiments, the highly user-perceived type includes an alarm clock application triggering type or a music application timed playback type.

In some embodiments, the unfreezing event includes any one of a tapping event, a system broadcast event, and an application timed reminder event.

In some embodiments, the process information is a process ID.

The application management apparatus in this embodiment may be configured to implement the solutions in the foregoing method embodiments. An implementation principle and effects thereof are similar to those in the method embodiments, and details are not described herein again.

Figure 9:
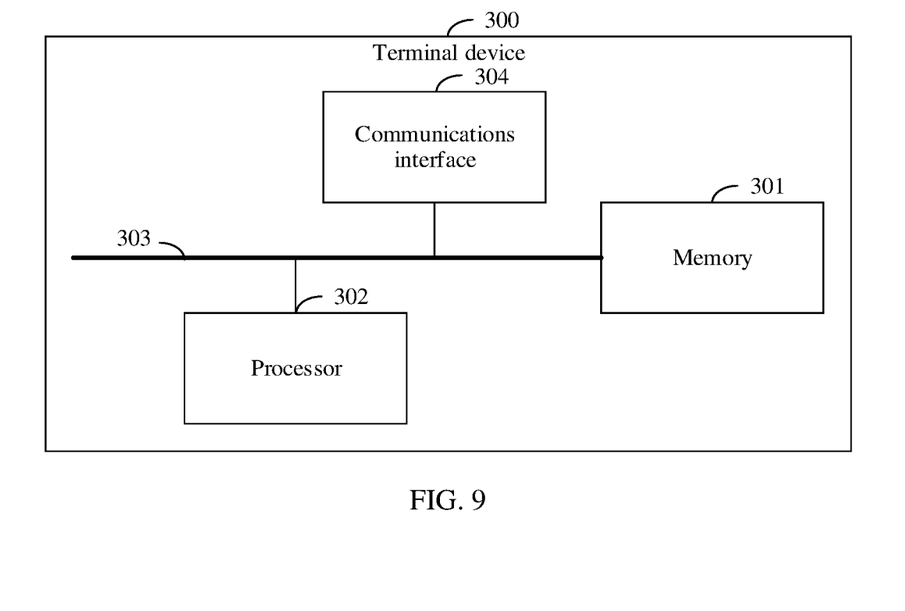
FIG. 9 is a schematic diagram of a hardware structure of a terminal device.

FIG. 9 is a schematic diagram of a hardware structure of a terminal device. As shown in FIG. 9, the terminal device 300 may be a device that uses the operating system shown in FIG. 1 and that has functions of obtaining an unfreezing event and performing an unfreezing operation on an application or a process in the application, and is configured to implement operations corresponding to the terminal device in any one of the foregoing method embodiments.

The terminal device 300 in an exemplary embodiment may be a wireless terminal or a wired terminal. The wireless terminal may be a device that provides a user with voice and/or connectivity of other service data, for example, a handheld device with a wireless connection function, or another processing device connected to a wireless modem. The wireless terminal may communicate with one or more core networks by using a RAN. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, and exchanges voice and/or data with the RAN. For example, the wireless terminal may be a device such as a PCS) phone, a cordless telephone set, an SIP phone, a WLL station, or a PDA. The wireless terminal may also be referred to as a system, a subscriber unit, a subscriber station, a mobile station, a mobile console, a remote station, a remote terminal, an access terminal, a user terminal, a user agent, or user equipment (User Device). This is not limited herein.

The terminal device 300 in this embodiment may include a memory 301 and a processor 302. The memory 301 may be connected to the processor 302 through a bus 303, where
the memory 301 is configured to store program code; and
the processor 302 invokes program code, and is configured to perform the application management method in any one of the foregoing embodiments when the program code is executed. For details, refer to related descriptions in the foregoing method embodiments.

Optionally, a communications interface 304 is further included in this embodiment. The communications interface 304 may be connected to the processor 302 through the bus 303. The processor 302 may control the communications interface 303 to implement the foregoing functions of the terminal device 300.

The terminal device in this embodiment may be configured to implement the solutions in the foregoing method embodiments. An implementation principle and effects thereof are similar to those in the method embodiments, and details are not described herein again.

In the several embodiments provided, it should be understood that the disclosed device and method may be implemented in other manners. For example, the described device embodiment is merely an example. For example, module division is merely logical function division and may be other division in actual implementation. For example, a plurality of modules may be combined or integrated into another system, or some features may be ignored or not be performed. In addition, the displayed or discussed mutual couplings or direct couplings or communication connections may be implemented through some interfaces. The indirect couplings or communication connections between the apparatuses or modules may be implemented in electrical, mechanical, or other forms.

The modules described as separate parts may or may not be physically separate, and parts displayed as modules may or may not be physical units, may be located in one position, or may be distributed on a plurality of network units. Some or all of the modules may be selected depending on an actual requirement to achieve the objectives of the solutions in the embodiments.

In addition, various functional modules in the embodiments may be integrated into one processing unit, each module may exist alone physically, or at least two modules may be integrated into one unit. The unit integrated with the modules may be implemented in a form of hardware, or may be implemented in a form of hardware and a software functional unit.

The foregoing integrated module implemented in a form of a software functional module may be stored in a computer-readable storage medium. The software functional module is stored in a storage medium and includes several instructions for instructing a computer device (which may be a personal computer, a server, a network device, or the like) or a processor to perform some of the steps of the methods in the embodiments.

It should be understood that the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The steps of the methods disclosed with reference to the embodiments may be directly implemented by a hardware processor, or may be implemented by a combination of hardware in the processor and a software module.

The memory may include a high-speed RAM memory, and may further include a nonvolatile memory NVM, for example, at least one magnetic disk memory, or may be a USB flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. The bus may be classified into an address bus, a data bus, a control bus, and the like.

For ease of representation, the bus in the accompanying drawings is not limited to only one bus or one type of bus. All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instruction is loaded and executed on a computer, all or some of the procedures or functions according to the embodiments are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. An application management method, comprising:
    obtaining an unfreezing event, wherein the unfreezing event includes process information, and the unfreezing event is used to trigger an unfreezing operation to be performed on at least one process in a frozen application;
    determining a target application based on a correspondence between an application and the process information, and performing an unfreezing operation on the at least one process while other processes in the target application remain frozen; and
    obtaining, based on a prestored correspondence between a process and a resource and the process information of the at least one process, a resource corresponding to at least one of the at least one process, and allocating the resource to the at least one process.

2. The method according to claim 1, wherein before determining the at least one process in the target application, the method further comprises:
    determining, the target application corresponding to the process information.

3. The method according to claim 1, wherein the unfreezing event further comprises an application identifier, and the application identifier is used to identify the application corresponding to the process information; and
    before determining the at least one process in the target application based on a correspondence between the application and the at least one process and the process information, and performing the unfreezing operation on the at least one process, the method further comprises:
        determining the target application corresponding to the application identifier.

4. The method according to claim 1, wherein the determining the at least one process in the target application based on a correspondence between an application and a process and the process information, and performing the unfreezing operation on the at least one process further comprises:
    determining the at least one process in the target application when it is determined that the unfreezing event satisfies an unfreezing condition of the at least one process, and performing the unfreezing operation on the at least one process.

5. The method according to claim 4, wherein the unfreezing condition of the at least one process further comprises at least N of the following conditions, wherein N is a natural number:
    the unfreezing event is not a tapping event;
    a type of the unfreezing event does not belong to a highly user-perceived type; and
    the application corresponding to the unfreezing event is not comprised in a prediction application set, wherein the prediction application set comprises at least one application to be used by a user.

6. The method according to claim 1, wherein the method further comprises:
    obtaining, based on a correspondence between an application and a resource and the application identifier, a resource corresponding to the target application when resources corresponding to the at least one process are not obtained based on the correspondence between a process and a resource and the process information of the at least one process, and allocating the resource to the target application.

7. The method according to claim 5, wherein the tapping event comprises at least one of a desktop icon tapping event, a notification bar tapping event, a recent-task-list tapping event, and a lock screen tapping event.

8. The method according to claim 5, wherein the highly user-perceived type comprises: an alarm clock application triggering type or a music application timed playback type.

9. The method according to claim 1, wherein the unfreezing event comprises at least one of a tapping event, a system event, and an application timed reminder event.

10. The method according to claim 1, wherein the process information is a process ID.

11. A terminal device, comprising:
    a memory and one or more processors, wherein
    the memory is configured to store instructions; and
    the one or more processors are configured to invoke the instructions stored in the memory to perform the steps of:
    obtaining an unfreezing event, wherein the unfreezing event includes process information, and the unfreezing event is used to trigger an unfreezing operation to be performed on at least one process in a frozen application;
    determining the at least one process in a target application based on a correspondence between an application and a process and the process information, and performing an unfreezing operation on the at least one process while other processes in the target application remain frozen; and
    obtaining, based on a prestored correspondence between a process and a resource and the process information of the at least one process, a resource corresponding to at least one of the at least one process, and allocating the resource to the at least one process.

12. The terminal device according to claim 11, wherein the one or more processors are further configured to perform the step of:
    determining, based on the correspondence between an application and a process and the process information, the target application corresponding to the process information.

13. The terminal device according to claim 11, wherein the unfreezing event further comprises an application identifier, and the application identifier is used to identify the application corresponding to the process information; and the one or more processors are further configured to perform the step of: determining the target application corresponding to the application identifier.

14. The terminal device according to claim 11, wherein the one or more processors are further configured to perform the steps of:

determining the at least one process in the target application based on a correspondence between an application and a process and the process information when it is determined that the unfreezing event satisfies an unfreezing condition of the at least one process, and performing the unfreezing operation on the at least one process.

15. The terminal device according to claim 11, wherein the one or more processors are further configured to perform the steps of:

obtaining, based on a correspondence between an application and a resource and the application identifier, a resource corresponding to the target application when resources corresponding to the at least one process are not obtained based on the correspondence between a process and a resource and the process information of the at least one process, and allocating the resource to the target application.

16. A non-transitory storage medium, comprising: instructions, and when the instructions are performed by one or more processors cause the one or more processors to implement:

obtaining an unfreezing event, wherein the unfreezing event includes process information, and the unfreezing event is used to trigger an unfreezing operation to be performed on at least one process in a frozen application;

determining the at least one process in the target application based on a correspondence between an application and a process and the process information, and performing an unfreezing operation on the at least one process while other processes in the target application remain frozen; and obtaining, based on a prestored correspondence between a process and a resource and the process information of the at least one process, a resource corresponding to at least one of the at least one process, and allocating the resource to the at least one process.

17. The non-transitory storage medium according to claim 16, wherein the one or more processors are further caused to implement:

determining, based on the correspondence between an application and a process and the process information, the target application corresponding to the process information.

18. The non-transitory storage medium according to claim 16, wherein the one or more processors are further caused to perform the steps of:

determining the at least one process in the target application based on a correspondence between an application and a process and the process information when it is determined that the unfreezing event satisfies an unfreezing condition of the at least one process, and performing the unfreezing operation on the at least one process.

* * * * *